United States Patent [19]

Polatajko-Lobos et al.

[11] Patent Number: 4,474,919

[45] Date of Patent: Oct. 2, 1984

[54] POLYALKYLENE GLYCOL STABILIZED ALKALI SWELLABLE LATEX

[75] Inventors: Elsa S. Polatajko-Lobos; Zbigniew J. Lobos, both of Sarnia, Canada

[73] Assignee: Polysar Limited, Sarnia, Canada

[21] Appl. No.: 365,190

[22] Filed: Apr. 5, 1982

Related U.S. Application Data

[63] Continuation of Ser. No. 96,798, Nov. 23, 1979, abandoned.

[30] Foreign Application Priority Data

Dec. 14, 1978 [CA] Canada .................................. 317972

[51] Int. Cl.$^3$ ...................... C08L 33/08; C08L 33/20; C08K 5/09
[52] U.S. Cl. .................................... 524/377; 252/407; 427/391
[58] Field of Search ................ 252/407; 428/511, 512, 428/513, 514, 537; 427/391; 524/377

[56] References Cited

U.S. PATENT DOCUMENTS

| | | | |
|---|---|---|---|
| 3,842,025 | 10/1974 | Schluter | 524/377 X |
| 3,879,326 | 4/1975 | Burke, Jr. | 260/820 X |
| 3,954,886 | 5/1976 | Langdon | 252/358 X |
| 4,061,833 | 8/1977 | Pelletier et al. | 427/391 X |
| 4,111,881 | 9/1978 | Paul | 260/29.2 E |
| 4,176,108 | 11/1979 | Cami et al. | 427/391 X |

FOREIGN PATENT DOCUMENTS

| | | |
|---|---|---|
| 1139519 | 1/1969 | United Kingdom . |
| 1294173 | 10/1972 | United Kingdom . |
| 1391593 | 4/1975 | United Kingdom . |

OTHER PUBLICATIONS

The Condensed Chemical Dictionary, 9th Edition, Van Nostrand Reinhold Co., pp. 262, 339–340, 811, 830, 831 and 926.

"Physical and Chemical Examination of Paints, Varnishes, Lacquers and Colors", Henry A. Gardner et al., Jan. 1950, p. 306.

*Primary Examiner*—Thurman K. Page
*Attorney, Agent, or Firm*—Stevens, Davis, Miller & Mosher

[57] ABSTRACT

The upward drift in viscosity which is characteristic of paper coating compositions prepared from alkali-swellable latices to which alkali has been added can be arrested at any desired level by including in the coating composition 0.1–10 parts by weight, per 100 parts by weight of dry solids in the uncompounded alkali-swellable latex, of a poly- $C_{2-4}$ alkylene glycol having an average molecular weight of about 100–5,000. Polyethylene and polypropylene glycols having molecular weights of about 1,200 are shown to produce excellent results with latices of carboxylic copolymers of butadiene and styrene.

8 Claims, No Drawings

POLYALKYLENE GLYCOL STABILIZED ALKALI SWELLABLE LATEX

This is a continuation of application Ser. No. 096,798, filed Nov. 23, 1979, now abandoned.

BACKGROUND OF THE INVENTION

This invention relates to paper coating compositions based on alkali-swellable latices.

Alkali swellable latices are those latices which are pH-sensitive in that they provide paper coating compositions which display increasing viscosities with increasing pH in the alkaline range of pH values. These latices are also characterized by an upward drift in viscosity on standing after addition of alkali. This pH-sensitivity is thought to result from the presence in the polymer molecules of groups such as carboxylic and ester groups which are capable of forming inter-molecular hydrogen bonds as favourable steric conditions arise during the Brownian motion of the molecules. As the hydrogen bonding progresses, the viscosity of the system rises and eventually a gel is formed if the hydrogen bonding is allowed to continue long enough.

Use of alkali-swellable latices as binders in paper coating compositions is desirable since the swelling action induced by the addition of alkali involves the absorption of water and thus improves the water retention and rheological properties of the coating composition. The drying properties are also improved since the absorbed water tends to be retained in the coating and not soaked up immediately by the paper.

While alkali-swellable characteristics are desirable in paper coating compositions, it is necessary for optimum paper coating operations that the viscosity rise be stopped and levelled off at the desired point. This increase in viscosity can be controlled to some extent by supplying kinetic energy to the system such as by agitation, and also by heating, by limiting the amount of near-the-surface carboxylation in the polymer particles and by being careful to avoid the addition of excess alkali to the system. For commercial scale operations it is desirable to have a means for controlling the viscosity of an alkali-swellable coating composition at the optimum level which is more reliable and requires less care and allows for more leeway for variation in operations than is presently available.

SUMMARY OF THE INVENTION

It has now been found that the viscosity of a paper coating composition prepared from an alkali-swellable latex can be increased by the addition of alkali and held at the desired level by adding to the paper coating composition 0.1–10 parts of a poly-$C_{2-4}$-alkylene glycol having a weight average molecular weight of 100–5,000, said parts being parts by weight per 100 parts by weight of total solids in the uncompounded starting latex.

DETAILED DESCRIPTION

As indicated above, the polyglycols most useful in this invention are polymers of $C_2$–$C_4$ alkylene glycols having weight average molecular weights in the range of about 100–5,000 or more. For polyethylene glycols the best results will be obtained with polymers containing 10 to 100 ethylene glycol units and preferably about 20–100 representing weight average molecular weights of about 900–4,400. For polypropylene glycols best results will be obtained with polymers containing 5 to 50 propylene glycol units and preferably about 10–50 representing weight average molecular weights of about 600–3,000. For polybutylene glycols best results will be obtained with polymers containing 2–10 butylene glycol units representing weight average molecular weights of about 150–700.

Within any one type of polyglycol larger amounts of the lower molecular weight species will be required to achieve the same control as smaller amounts of the higher molecular weight species. The amount needed to be used will be influenced by the level of viscosity desired. Larger amounts of polyglycol will be required to obtain higher working viscosity levels and smaller amounts for lower viscosity levels. The working level of viscosity desired will depend on the nature of the paper being coated and the coating method which is to be used. For example, the more porous papers require higher viscosities in the coating compounds than do the less porous papers and blade coating requires higher viscosities than does air-knife coating. For polyethylene glycols the amount used will normally be in the range of 0.1–10% by weight per 100 parts by weight of total weight of dry solids in the starting uncompounded latex with about 4–10 weight % being used for the lower molecular weight species and about 0.1–4% being used for the higher molecular weight species. For polypropylene glycols the amount used will normally be in the range of 0.5–5% by weight on the dry solids in the latex and the amounts for the lower and higher molecular weight species being 0.5–5% and 0.5–3% respectively. For polybutylene glycols the amounts used will be in the range of about 0.1–0.5% by weight per 100 parts by weight of dry solids in the latex.

As indicated above, the term "alkali-swellable" as applied to the latices of this specification means that the addition of an alkali to the latex will cause the latex to thicken and show an increase in viscosity. To obtain this thickening effect and increase in viscosity, the polymer in the latex should comprise at least about 3% by weight of total polymerized monomers of one or more copolymerized ethylenically unsaturated carboxylic acids containing at least one acid radical per molecule or lower alkyl esters of these acids, e.g. 3–15 weight % of such copolymerized carboxylic acid-based monomers and preferably 3–10 wt.%.

Suitable ethylenically unsaturated carboxylic acids and their lower alkyl esters are those known to be suitable for preparing latices to be used as binders for paper coating compositions. They might be described as acrylic acid and its $C_1$–$C_5$ alkyl, $C_1$–$C_5$ alkenyl and phenyl derivatives. These include the mono- and polyethylenically unsaturated acids containing one or more acid radicals per molecule; the lower alkyl esters of these acids and the lower alkyl and phenyl substituted derivatives of these acids and esters. Examples of these monomers include acids such as acrylic, ethacrylic, crotonic, maleic, fumaric, itaconic, cinnamic and sorbic acids, methyl acrylate, butyl acrylate, methyl methacrylate, ethyl methacrylate, etc. These monomers are of most use when they are copolymerized so as to be at or near the surface of the latex polymer particles. This can be accomplished by adding a portion or all of them subsequent to the start of the polymerization such as after 5–85% conversion of the other monomers has been reached. The addition of these carboxylic acid-based monomers can be continuous or intermittent throughout the polymerization.

The carboxylic acid-based monomers are normally copolymerized with other non-acidic monomers in preparing latices for paper coating purposes. These other monomers usually comprise a $C_4$-$C_8$ conjugated diolefin monomer and another monoethylenically unsaturated monomer free of carboxylic acid or ester groups.

The conjugated diolefins are normally butadiene-1,3 monomers such as butadiene-1,3, 2-methyl butadiene-1,3, 2,4-dimethyl butadiene-1,3, 2,3-dimethyl butadiene-1,3, 2-chloro butadiene-1,3, etc. Conjugated 1,3-butadienes containing 4-6 carbon atoms are preferred, particularly butadiene-1,3.

The monoethylenically unsaturated non-carboxylic monomer is usually an alkenyl mononuclear aromatic compound or a lower alkyl- or halo-substituted derivative such as styrene, alpha-methyl styrene, alpha-chloro styrene, ortho-, meta- and para-ethyl styrene, etc. It has been known to replace up to 90% of the weight of the alkenyl aromatic monomer with other polymerizable vinyl compounds such as acrylic nitrile monomers such as acrylonitrile and lower alkyl and chloro-substituted acrylonitriles, etc.

Normally the latex is prepared by copolymerizing 3-15% by weight of the acid or ester monomer with 85-97 weight % of a mixture of the other monomers. This mixture may be composed of 25-75 weight % of the non-carboxylic monomer and 25-75 weight % of the conjugated diolefin monomer with 0-90 weight % of the non-carboxylic monomer being replaced if desired with another monomer such as an acrylic nitrile monomer. The monomers are emulsified in water with emulsifiers capable of supporting polymerization in an acidic medium and maintaining the resulting latex stable at both acidic and alkaline pH conditions. Anionic and non-ionic emulsifiers are known to be suitable for this purpose. They include alkyl sulfates and sulfonates, alkylaryl sulfonates, e.g. sodium lauryl sulfate, sodium oleyl sulfonate, sodium dodecyl benzene sulfonate, alkyl and alkylaryl polyether sulfates and sulfonates, e.g. sodium lauryl ether sulfate, sodium dodecyl diphenyl ether disulfonate, sodium benzyl ether sulfate and ethoxylated alkyl phenols, amides and alcohols. A good emulsifier is a mixture of the disodium salt of ethoxylated half ester of sulfosuccinic acid and the dihexyl ester of sodium sulfosuccinic acid. The amount used may vary within fairly wide limits but usually ranges from about 1 to 6 parts by weight per hundred parts by weight of monomers. The monomers are normally polymerized under acidic conditions with the aid of a free radical initiator such as hydrogen peroxide, an alkali metal or ammonium persulfate, azobisisobutyronitrile or redox initiator pair comprising a reducing compound and a peroxide, at 5°-90° C. in the presence of a molecular weight regulator such as an alkyl mercaptan as is well known in the polymerization art. As indicated earlier, part or all of the carboxylic acid-based monomers can be added continually or intermittently after the start of the polymerization to assure that a sufficient amount of them are at or near the surface of the polymer particles formed during the polymerization. After the latex has been prepared it can be converted to an alkaline pH and used to prepare the coating compositions.

The following examples are provided to illustrate the invention in greater detail. Unless otherwise noted all parts and percentages are on a dry weight basis.

Preliminary Experiment

An alkali-swellable latex of a copolymer of 50% butadiene, 40% styrene and 10% acrylic acid having a total solids content of 46.5%, a pH of 3.3 and a coagulum level of less than 0.01% as measured on a Tyler No. 325 screen was compounded into a paper coating composition as indicated below and tested for variation in viscosity with increasing pH. The increase in pH was attained by the addition of increments of a 25 weight % solution of sodium hydroxide in water. After each increment, the system was agitated for 15 minutes before the pH and viscosity tests were carried out.

| Paper Coating Composition | |
|---|---|
| | Parts |
| Latex | 15.0 |
| Clay | 85.0 |
| Calcium Carbonate | 15.0 |
| Melamine-formaldehyde resin | 0.7 |
| Calcium stearate lubricant | 0.7 |
| Polyglycol | none |
| Water to 60% solids | variable |

As can be seen from the data in Table I, in the absence of a polyglycol the viscosity of the paper coating composition increases with increasing pH and does not level off at any point. The viscosities were measured using a Brookfield RTV viscometer-an instrument well known in the industry.

TABLE I

| pH | Viscosity - centipoises | |
|---|---|---|
| 5.7 | 270 | (No. 4 spindle at 100 rpm) |
| 7.5 | 220 | " |
| 8.4 | 430 | " |
| 9.3 | 1100 | " |
| 10.2 | 1840 | (No. 5 spindle at 100 rpm) |
| 11.1 | 1880 | " |
| 12.0 | 480 | " |

EXAMPLES 1-7

Varying amounts of different polyalkylene glycols were added to samples of a paper coating composition prepared as disclosed in the Preliminary Experiment and the viscosity-pH relationship was determined as in the Preliminary Experiment. The results are recorded in Table II.

TABLE II

| Example | Type & Amount of Polyglycol | | | | | | | | |
|---|---|---|---|---|---|---|---|---|---|
| 1 | *PEG 400 (4%) (400 mol. wt.) | pH | 6.0 | 7.5 | 8.5 | 9.0 | 10.0 | 11.0 | 12.0 |
| | | Viscosity (cps) | 280 | 240 | 460 | 600 | 1740 | 2000 | 2200 |
| | | Spindle | 4 | 4 | 4 | 4 | 5 | 5 | 5 |
| 2 | PEG 1200 (0.5%) (1200 mol. wt.) | pH | 6.0 | 7.5 | 8.2 | 9.0 | 10.0 | 12.0 | |
| | | Viscosity | 260 | 300 | 400 | 2000 | 4400 | 3200 | |
| | | Spindle | 4 | 4 | 4 | 7 | 7 | 7 | |
| 3 | **PPG 1200 (0.5%) (1200 mol. wt.) | pH | 5.7 | 7.5 | 8.6 | 9.4 | 10.0 | 11.0 | 12.0 |
| | | Viscosity | 280 | 280 | 450 | 810 | 1680 | 2200 | 2200 |
| | | Spindle | 4 | 4 | 4 | 4 | 5 | 5 | 5 |

TABLE II-continued

| Example | Type & Amount of Polyglycol | | | | | | | | |
|---|---|---|---|---|---|---|---|---|---|
| 4 | PPG 1200 (1.0%) (1200 mol. wt.) | pH | 5.9 | 7.5 | 8.5 | 9.2 | 10.5 | 12.0 | |
| | | Viscosity | 300 | 440 | 800 | 4000 | 4000 | 4000 | |
| | | Spindle | 4 | 4 | 4 | 7 | 7 | 7 | |
| 5 | PPG 1200 (2.0%) (1200 mol. wt.) | pH | 5.8 | 7.6 | 8.5 | 9.3 | 10.0 | 11.0 | 12.0 |
| | | Viscosity | 260 | 240 | 590 | 960 | 2280 | 3040 | 2840 |
| | | Spindle | 4 | 4 | 4 | 4 | 5 | 5 | 5 |
| 6 | PPG 1200 (4.0%) (1200 mol. wt.) | pH | 5.7 | 8.6 | 9.3 | 11.4 | 12.2 | | |
| | | Viscosity | 240 | 1800 | 2200 | 4700 | 4300 | | |
| | | Spindle | 4 | 4 | 5 | 6 | 6 | | |
| 7 | ***PBG 500 (0.25%) (500 mol. wt.) | pH | 6.0 | 7.5 | 8.5 | 9.0 | 10.5 | 12.0 | |
| | | Viscosity | 318 | 358 | 458 | 2500 | 5000 | 5100 | |
| | | Spindle | 4 | 4 | 4 | 7 | 7 | 7 | |

*polyethyleneglycol
**polypropyleneglycol
***polybutyleneglycol

The data in Table II demonstrate the effectiveness of the various polyalkylene glycols in arresting further rise in the viscosities of the paper coating compositions. It can be seen that a judicious selection in the type and amount of polyglycol will permit easy control of viscosity level.

EXAMPLE 8

A sample of the paper coating composition of Example 4 containing 1.0 weight % polypropylene glycol 1200 was tested to determine the length of time that the polyglycol was effective in holding the viscosity constant at the 4000 centipoise level at the highest pH (i.e. pH=12) to which it had been raised in that example. The results are recorded in Table III.

TABLE III

| Day | pH | Viscosity | Spindle |
|---|---|---|---|
| 1 | 12.0 | 4000 | No. 7 |
| 2 | 12.0 | 4000 | " |
| 3 | 12.0 | 4000 | " |
| 4 | 12.0 | 4200 | " |
| 5 | 12.0 | 4300 | " |

Thus, it is seen that the viscosity remained constant for three days and rose only slightly in each of the fourth and fifth days.

This shows the high degree of effectiveness displayed by the polyglycol in preventing for a lengthy period of time further rise in the viscosity of the paper coating compound in the presence of excess alkali.

What is claimed is:

1. A method for maintaining a viscosity of from 250 to 5100 cps in a paper coating composition which has had sufficient alkali added to it to obtain said viscosity, said paper coating composition comprising per 100 parts by combined weight of pigment, clay and filler from about 10 to about 20 parts by dry weight of an alkali swellable latex prepared by the emulsion polymerization of a monomeric mixture comprising:
   (a) from about 3 to about 15 percent by weight of an unsaturated carboxylic acid monomer containing at least one carboxylic acid radical per molecule, or a $C_{1-5}$ alkyl or a $C_{2-5}$ alkenyl ester thereof; and
   (b) from about 85 to about 97 percent by weight of a mixture of other monomers comprising:
      (i) from about 25 to 75 percent by weight of such other mixture of a $C_{4-8}$ conjugated diene; and
      (ii) from about 75 to 25 percent by weight of such other mixture comprising:
         (a) from 100 to about 10 percent by weight of an alkenyl mononuclear aromatic compound which may be unsubstituted or substituted by a $C_{1-5}$ alkyl radical or a chlorine or bromine atom; and
         (b) from about 90 to 0 percent by weight of an acrylic nitrile monomer which may be unsubstituted or substituted by a $C_{1-5}$ alkyl radical or a chlorine or bromine atom;
   which comprises adding to said paper coating composition from 0.1 to 10 parts by weight per 100 parts by weight of solids in said alkali swellable latex of a poly $C_{2-4}$ alkylene glycol having a weight average molecular weight from 100 to 5000.

2. A method according to claim 1 wherein, said polyalkylene glycol is polyethylene glycol having a weight average molecular weight from 900 to 1,200 and is present in an amount from 4 to 10 parts by weight per 100 parts by weight of solids in the stable alkali swellable latex.

3. A method according to claim 1 wherein, said polyalkylene glycol is polyethylene glycol having a weight average molecular weight from 1,200 to 4,400 and is present in an amount from 0.1 to 4 parts by weight per 100 parts by weight of solids in the stable alkali swellable latex.

4. A method according to claim 1, wherein said polyalkylene glycol is polypropylene glycol having a weight average molecular weight from 600 to 1,200 and is present in an amount from 0.5 to 5 parts by weight per 100 parts by weight of solids in the stable alkali swellable latex.

5. A method according to claim 1, wherein said polyalkylene glycol is polyethylene glycol having a weight average molecular weight from 1,200 to 3,000 and is present in an amount from 0.5 to 3 parts by weight per 100 parts by weight of solids in the stable alkali swellable latex.

6. A method according to claim 1, wherein said polyalkylene glycol is polybutylene glycol having a weight average molecular weight from 150 to 700 and is present in an amount from 0.1 to 0.5 parts by weight per 100 parts by weight of solids in the stable alkali swellable latex.

7. An alkali-swellable paper coating composition prepared according to a method as claimed in claim 1.

8. A method according to claim 3, 5 or 6 wherein the unsaturated carboxylic acid monomer is selected from acrylic acid, methacrylic acid, crotonic acid, maleic acid, fumaric acid, itaconic acid, cinnamic acid and sorbic acid; the conjugated diene is selected from butadiene or isoprene, the alkenyl mononuclear aromatic monomer is selected from styrene and α-methyl styrene; and the acrylate nitrile is acrylonitrile.

* * * * *